United States Patent
Kim et al.

(10) Patent No.: US 10,620,782 B2
(45) Date of Patent: Apr. 14, 2020

(54) APPARATUS AND METHOD FOR REMOTELY CONTROLLING PERIPHERAL DEVICES IN MOBILE COMMUNICATION TERMINAL

(71) Applicant: Samsung Electronics Co., Ltd., Gyeonggi-do (KR)

(72) Inventors: Du-Seok Kim, Gyeonggi-do (KR);
Hyun-Cheol Park, Gyeonggi-do (KR);
Giu-Yeol Kim, Gyeonggi-do (KR);
Jun-Mo Yang, Gyeonggi-do (KR);
Dong-Yun Shin, Gyeonggi-do (KR);
Hyo-Yong Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 15/600,655

(22) Filed: May 19, 2017

(65) Prior Publication Data
US 2017/0255362 A1    Sep. 7, 2017

Related U.S. Application Data

(63) Continuation of application No. 14/508,966, filed on Oct. 7, 2014, now Pat. No. 9,665,242, which is a
(Continued)

(30) Foreign Application Priority Data

Jan. 4, 2011    (KR) .................... 10-2011-0000370

(51) Int. Cl.
*G06F 3/0481*    (2013.01)
*G06F 9/24*    (2006.01)
(Continued)

(52) U.S. Cl.
CPC ........ *G06F 3/04817* (2013.01); *G06F 3/0488* (2013.01); *G06F 3/04842* (2013.01);
(Continued)

(58) Field of Classification Search
CPC ....................... G06F 3/04817; G06F 9/4411
See application file for complete search history.

(56) References Cited

U.S. PATENT DOCUMENTS 5,832,298 A    11/1998    Sanchez et al.
6,473,788 B1   10/2002    Kim et al.
(Continued)

FOREIGN PATENT DOCUMENTS

CN    101238698 A    8/2008
CN    101346935 A    1/2009
(Continued)

OTHER PUBLICATIONS

"Personal Computer," Encyclopedia.com, 2002, http://www.encyclopedia.com/topic/personal_computer.aspx.
(Continued)

*Primary Examiner* — Farley Abad

(57) ABSTRACT

According to one embodiment, a method for remotely controlling peripheral devices in a mobile communication terminal includes acquiring a profile for a controlled peripheral device, configuring a control application for the controlled peripheral device based on the acquired profile, and controlling the controlled peripheral device using the configured control application.

20 Claims, 4 Drawing Sheets

Related U.S. Application Data continuation of application No. 13/343,415, filed on Jan. 4, 2012, now Pat. No. 8,856,411.

(51) Int. Cl.
| | |
|---|---|
| *H04L 12/28* | (2006.01) |
| *H04L 29/08* | (2006.01) |
| *G08C 17/02* | (2006.01) |
| *G06F 9/4401* | (2018.01) |
| *G06F 3/0484* | (2013.01) |
| *G06F 3/0488* | (2013.01) |
| *G06F 15/177* | (2006.01) |
| *H04W 4/80* | (2018.01) |

(52) U.S. Cl.
CPC .............. *G06F 9/24* (2013.01); *G06F 9/4411* (2013.01); *G08C 17/02* (2013.01); *H04L 12/281* (2013.01); *H04L 12/282* (2013.01); *H04L 67/303* (2013.01); *G06F 15/177* (2013.01); *G08C 2201/92* (2013.01); *H04L 67/34* (2013.01); *H04W 4/80* (2018.02)

(56) References Cited

U.S. PATENT DOCUMENTS

| | | | |
|---|---|---|---|
| 6,963,923 | B1 | 11/2005 | Bennett |
| 7,027,881 | B2 | 4/2006 | Yumoto et al. |
| 7,263,353 | B2 | 8/2007 | Forsberg et al. |
| 7,376,590 | B2 | 5/2008 | Lee |
| 8,625,418 | B2 | 1/2014 | Kraemer et al. |
| 2002/0015856 | A1 | 2/2002 | Lyon et al. |
| 2002/0065728 | A1 | 5/2002 | Ogasawara |
| 2002/0078337 | A1* | 6/2002 | Moreau .................. G06F 3/1238 713/1 |
| 2002/0130834 | A1 | 9/2002 | Madarasz et al. |
| 2002/0144295 | A1 | 10/2002 | Hirata |
| 2002/0156947 | A1 | 10/2002 | Nishio |
| 2002/0186676 | A1* | 12/2002 | Milley ................. H04M 1/7253 370/341 |
| 2004/0088180 | A1 | 5/2004 | Akins, III |
| 2005/0154787 | A1 | 7/2005 | Cochran et al. |
| 2005/0169212 | A1* | 8/2005 | Doi ....................... G06F 3/0346 370/328 |
| 2005/0172228 | A1 | 8/2005 | Kakuda |
| 2006/0048194 | A1 | 3/2006 | Poslinski |
| 2006/0143572 | A1 | 6/2006 | Scott et al. |
| 2006/0271695 | A1 | 11/2006 | Lavian |
| 2007/0004393 | A1 | 1/2007 | Forsberg et al. |
| 2007/0032888 | A1 | 2/2007 | Hirata et al. |
| 2007/0201696 | A1 | 8/2007 | Hirata et al. |
| 2008/0018924 | A1 | 1/2008 | White et al. |
| 2008/0304408 | A1 | 12/2008 | Kraemer et al. |
| 2010/0081375 | A1 | 4/2010 | Rosenblatt et al. |
| 2011/0246427 | A1* | 10/2011 | Modak ................ G06F 11/1469 707/653 |
| 2012/0066707 | A1 | 3/2012 | Poder et al. |

FOREIGN PATENT DOCUMENTS

| | | |
|---|---|---|
| EP | 1693812 A1 | 8/2006 |
| JP | 2003143670 A | 5/2003 |
| JP | 2007219719 A | 8/2007 |
| KR | 2002-0015856 A | 3/2002 |
| KR | 10-2005-0091992 A | 9/2005 |
| KR | 10-2007-0054901 A | 5/2007 |
| KR | 10-2009-0039904 A | 4/2009 |

OTHER PUBLICATIONS

International Search Report dated Sep. 27, 2012, in connection with International Application No. PCT/KR2012/000077, 3 pages.
Written Opinion of the International Searching Authority dated Sep. 27, 2012, in connection with International Application No. PCT/KR2012/000077, 4 pages.
Patent Examination Report dated Jul. 4, 2014 in connection with Australian Patent Application No. 2012205113, 3 pages.
Extended European Search Report dated Oct. 14, 2014 in connection with European Patent Application No. 12732010.9, 7 pages.
Notice of Acceptance dated Aug. 11, 2015 in connection with Australian Patent Application No. 2012205113, 2 pages.
Notice of Preliminary Rejection dated Oct. 19, 2015 in connection with Japanese Patent Application No. 2013-547366, 8 pages.
The First Office Action dated Dec. 2, 2015 in connection with Chinese Patent Application No. 2012-80004660.6, 17 pages.
Communication from a foreign patent office in a foreign counterpart application, Text of Notice of Preliminary Rejection, Korean Application No. KR 10-2011-0000370, dated Dec. 14, 2017, 8 pages.
Office Action dated Jul. 10, 2018 in connection with European Patent Application No. 12 732 010.9.
Office Action dated Jun. 25, 2018 in connection with Korean Patent Application No. 10-2011-0000370.
Notice of Patent Grant dated Aug. 28, 2018 in connection with Korean Patent Application No. 10-2011-0000370.
Korean Intellectual Property Office, "Notice of Preliminary Rejection," Application No. KR 10-2018-0149395, dated Feb. 25, 2019, 16 pages.
Intellectual Property India, "Examination report under section 12 & 13 of the Patents Act, 1970 and the Patents Rules, 2003," Application No. IN 1421/KOLNP/2013, dated Dec. 27, 2018, 6 pages.
Korean Intellectual Property Office, "Notice of Patent Grant," Application No. KR 10-2018-0149395, dated Aug. 21, 2019, 5 pages.
Korean Intellectual Property Office Notice of Patent Grant regarding Application No. 10-2019-0149802, dated Dec. 19, 2019, 5 pages.
European Patent Office Summons to attend oral proceedings pursuant to Rule 115(1) EPC regarding Application No. 12732010.9, dated Feb. 13, 2020, 8 pages.

\* cited by examiner

APPARATUS AND METHOD FOR REMOTELY CONTROLLING PERIPHERAL DEVICES IN MOBILE COMMUNICATION TERMINAL

CROSS-REFERENCE TO RELATED APPLICATIONS AND CLAIM OF PRIORITY

This application is a continuation of U.S. patent application Ser. No. 14/508,966 filed Oct. 7, 2014, which is a continuation of U.S. patent application Ser. No. 13/343,415 filed Jan. 4, 2012 entitled "APPARATUS AND METHOD FOR REMOTELY CONTROLLING PERIPHERAL DEVICES IN MOBILE COMMUNICATION TERMINAL, which claims the benefit under 35 U.S.C, § 119(a) of a Korean patent application filed in the Korean intellectual Property Office on Jan. 4, 2011 and assigned Serial No. 10-2011-0000370, the entire disclosure of all of these patent applications are hereby incorporated by reference.

TECHNICAL FIELD

The present disclosure relates to a mobile communication terminal, and more particularly, to an apparatus and method for remotely controlling peripheral devices in a mobile communication terminal.

BACKGROUND

Information Technology (IT) convergence that includes characteristics between devices are intimately connected to each other, and new consumption contents that are created have become important to the IT industry. Also, devices have evolved from a device with firmware for single function to devices capable of embedding an Operating System (OS) and using many services for various purposes. For example, these newer devices may often include smart TV and tablet PC functionality.

Because it is possible to perform communication between devices through a variety of communication methods using a device with an OS and a network interface, it may be possible to provide a new service without the addition of physical device. That is, new services may be implemented on these converged devices using mostly software. Thus, it may be possible to provide services for controlling peripheral devices using a mobile device such as a smart phone through a representative function among these convergence functions. For example, a TV remote control function, a home theater control function, a car remote control function, a PC mouse keyboard function, etc. may be performed using a smart phone. Because each remote controller may have a physical input device customized to function with a corresponding device, there may be a disadvantage in which multiple physical remote controllers are required to control their respective devices. In order to solve the disadvantage, the functions of multiple remote controllers may be performed by the mobile device such as a smart phone. The mobile device may store instructions associated with the functions of multiple remote controllers to be used by its user. Herein, the mobile device may be a general term for a variety of devices, having an OS function and a communication network function, such as a mobile phone, a Personal Digital Assistants (PDA), a smart phone, a tablet Personal Computer (PC), and a notebook.

In order to remotely control a controlled peripheral device using a conventional mobile device, the user is often required to connect to an external server, download a suitable control application from the external server, and install the control application in the mobile device. Also, in order to control different controlled peripheral devices using the conventional mobile device, an application for each controlled peripheral device is often required to exist in the conventional mobile device. Accordingly, if the user does not remember where the remote controller is, he or she may spend a lot of time to find the remote controller.

Also, the conventional mobile device may control only a few functions of a controlled peripheral device (e.g., a volume and channel change function of a TV). Accordingly, the conventional mobile device does not correspond to optimized control & interaction corresponding to a smart service application which may be emerging, such as, a service application executed in a device having an OS such as a smart TV and a tablet PC. In other words, because the conventional mobile device like a general TV remote controller unidirectionally transmits a control signal or displays only information about a simple operation state, it may not provide optimized control methods of different applications executed in a device such as a smart TV. For example, in the smart TV, applications such as a game application, an explorer application, a magazine application, a messenger application, and a multimedia application exist. The conventional mobile device such as the general TV remote controller may not control these diverse applications easily and quickly.

Also, in order to control a variety of applications for each controlled peripheral device using the conventional mobile device, because the whole process to a program design, a User Interface (UI) task, and function implementation for each corresponding control application must be developed, a lot of investment cost and time is needed.

SUMMARY

To address the above-discussed deficiencies of the prior art, it is a primary object to provide at least the advantages described below. Accordingly, an aspect of the present disclosure is to provide an apparatus and method for remotely controlling peripheral devices in a mobile communication terminal.

Another aspect of the present disclosure is to provide an apparatus and method for configuring one integrated control disclosure based on a profile with respect to a variety of peripheral controllable devices and remotely controlling a controlled peripheral device using the configured control application.

In accordance with another aspect of the present disclosure, a method of controlling peripheral devices in a mobile communication terminal includes acquiring a profile for a controlled peripheral device, configuring a control application for the controlled peripheral device based on the acquired profile, and controlling the controlled peripheral device using the configured control application.

In accordance with another aspect of the present disclosure, an apparatus for controlling peripheral devices in a mobile communication terminal includes a profile manager for acquiring a profile for a controlled peripheral device, a dynamic configuration manager for configuring a control application for the controlled peripheral device based on the acquired profile, and a control interaction manager for controlling the controlled peripheral device using the configured control application.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

Hereinafter, an apparatus and method for remotely controlling peripheral devices in a mobile communication terminal according to an exemplary embodiment of the present disclosure will be described in detail. Hereinafter, the present disclosure will be described with reference to a terminal. However, the prevent disclosure may be applied to all mobile devices capable of controlling applications of peripheral devices.

Figure 1:
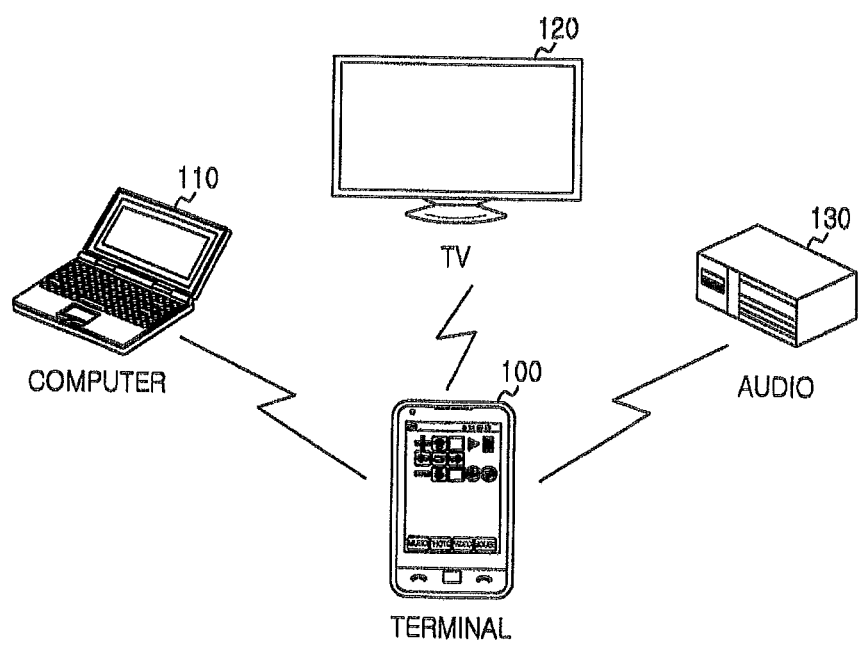
FIG. 1 illustrates an example mobile communication terminal and a controlled peripheral device according to one embodiment of the present disclosure.

FIG. 1 illustrates a mobile communication terminal and controlled peripheral devices according to the present disclosure. Mobile communication terminal includes a terminal 100 having input, display, and communication functions. The terminal 100 communicates with controlled peripheral devices 110, 120, and 130, acquires profiles of the controlled peripheral devices 110, 120, and 130, and configures one integrated control application using the acquired profiles. The terminal 100 remotely controls applications (or services) of the corresponding controlled peripheral devices 110, 120, and 130 using the configured integrated control application.

A profile server (not shown) manages profiles of the respective controlled peripheral devices 110, 120, and 130 and provides the profiles of the controlled peripheral devices 110, 120, and 130 to the terminal 100 according to request of the terminal 100. The profile server may be an external server or may be a local server. In certain embodiments, the controlled peripheral devices 110, 120, and 130 may manage their own profiles without the separate profile server. In this case, the profiles of the controlled peripheral devices 110, 120, and 130 may be provided to the terminal 100 using a Peer to Peer (P2P) type protocol through direct connection between the terminal 100 and the controlled peripheral devices 110, 120, and 130.

Figure 2:
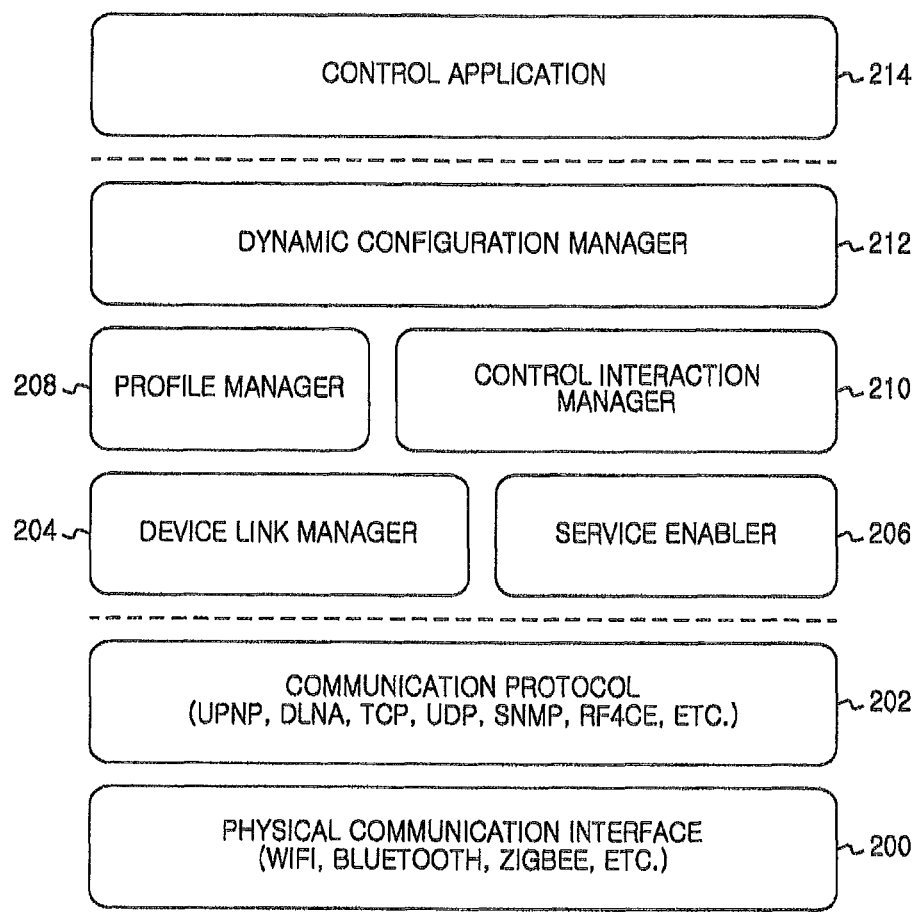
FIG. 2 illustrates example devices of a mobile communication terminal according to one embodiment of the present disclosure.

FIG. 2 illustrates an example mobile communication terminal according to one embodiment of the present disclosure. The mobile communication terminal includes a physical communication interface 200, a communication protocol 202, a device link manager 204, a service enabler 206, a profile manager 208, a control interaction manager 210, a dynamic configuration manager 212, and a control application 214. The physical communication interface 200 communicates with controlled peripheral devices through transmission means such as Wi-Fi, Bluetooth, and Zigbee. The communication protocol 202 may include a data transfer protocol such as a Universal Plug and Play (UPnP), a Digital Living Network Alliance (DLNA), a Transmission Control Protocol (TCP), a User Datagram Protocol (UDP), a Simple Network Management Protocol (SNMP), and a Radio Frequency for Consumer Electronics (RF4CE).

The device link manager 204 searches the controlled peripheral devices. Particularly, the device link manager 204 may broadcast a search request message to the controlled peripheral devices and receive response messages for the search request message from the controlled peripheral devices, using the communication protocol 202 and the physical communication interface 200. Each of the response messages may include information related to corresponding controlled peripheral device. For example, the information related to the controlled peripheral device may include a variety of information such as a device name, a model name, a device type, such as for indicating whether to control a device, a network address, and a service name, a service kind, an application name, and an application kind. Also, the device link manager 204 extracts the information related to the controlled peripheral devices from each of the response messages received according to the controlled peripheral devices and displays a controlled peripheral device list on a picture based on the extracted information related to the controlled peripheral devices.

The service enabler 206 searches services or applications performed in the controlled peripheral devices. Particularly, the service enabler 206 broadcasts a search request message to the controlled peripheral devices and receives response messages for the search request message from the controlled peripheral devices, using the communication protocol 202 and the physical communication interface 200. Each of the response messages includes information about a service or an application which is currently performed or changed from a corresponding controlled peripheral device.

Figure 4:
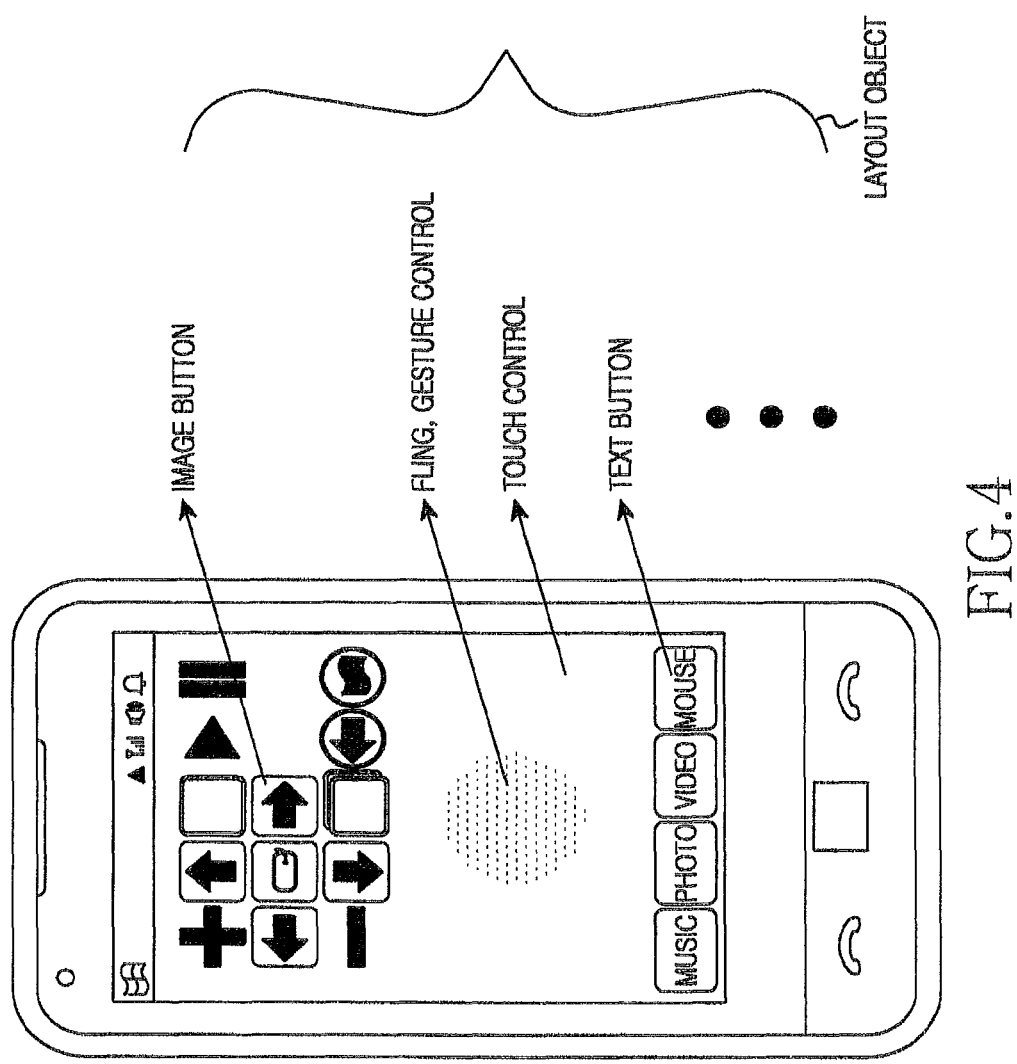
FIG. 4 illustrates example image information and layout information of objects configuring a picture according to one embodiment of the present disclosure.

If a profile of the controlled peripheral device does not exist in a memory (not shown), the profile manager 208 requests a profile server to transmit the profile of the corresponding controlled peripheral device, receives the corresponding profile from the profile server, and stores and manages the received profile in the memory (not shown) of the controlled peripheral device. In one embodiment, the profile includes User Interface (UI) information for configuring a picture and control command information to be registered in objects. Also, the profile may include a communication protocol. The UI information includes image information and layout information of the objects that may be used for configuring the picture. For example, as shown in FIG. 4, the objects may be objects of various types, such as a button, a touch input, a gesture input, a sensor input, a file list, a moving picture, and music, which may be provided to a user through a terminal.

Referring again to FIG. 2, the control interaction manager 210 remotely controls a controlled peripheral device using a configured control application 214. That is, if the user selects an image of an object arranged on the picture, the control interaction manager 210 verifies control command information mapped to the image of the object, processes the verified control command information according to a communication protocol (e.g., standards of a TCP, a UDP, a UPnP, etc.) defined in a corresponding profile, and transmits the processed control command information to a corresponding controlled peripheral device. Also, if information is received from the corresponding controlled peripheral device, the control interaction manager 210 analyzes the received information, compares the analyzed information with registered control command information, and performs an operation associated with the object selected by the user.

The dynamic configuration manager 212 analyzes a profile of a controlled peripheral device and configures the control application 214 for the controlled peripheral device in real time based on the analyzed result. That is, the dynamic configuration manager 212 extracts UI information for configuring a picture and control command information to be registered in an object from the profile of the controlled peripheral device, arranges an image of each object on the picture using the extracted UI information, connects the extracted control command information to each object, maps the image of each object arranged on the picture to the control command information for each object, and registers the mapped information.

Figure 3:
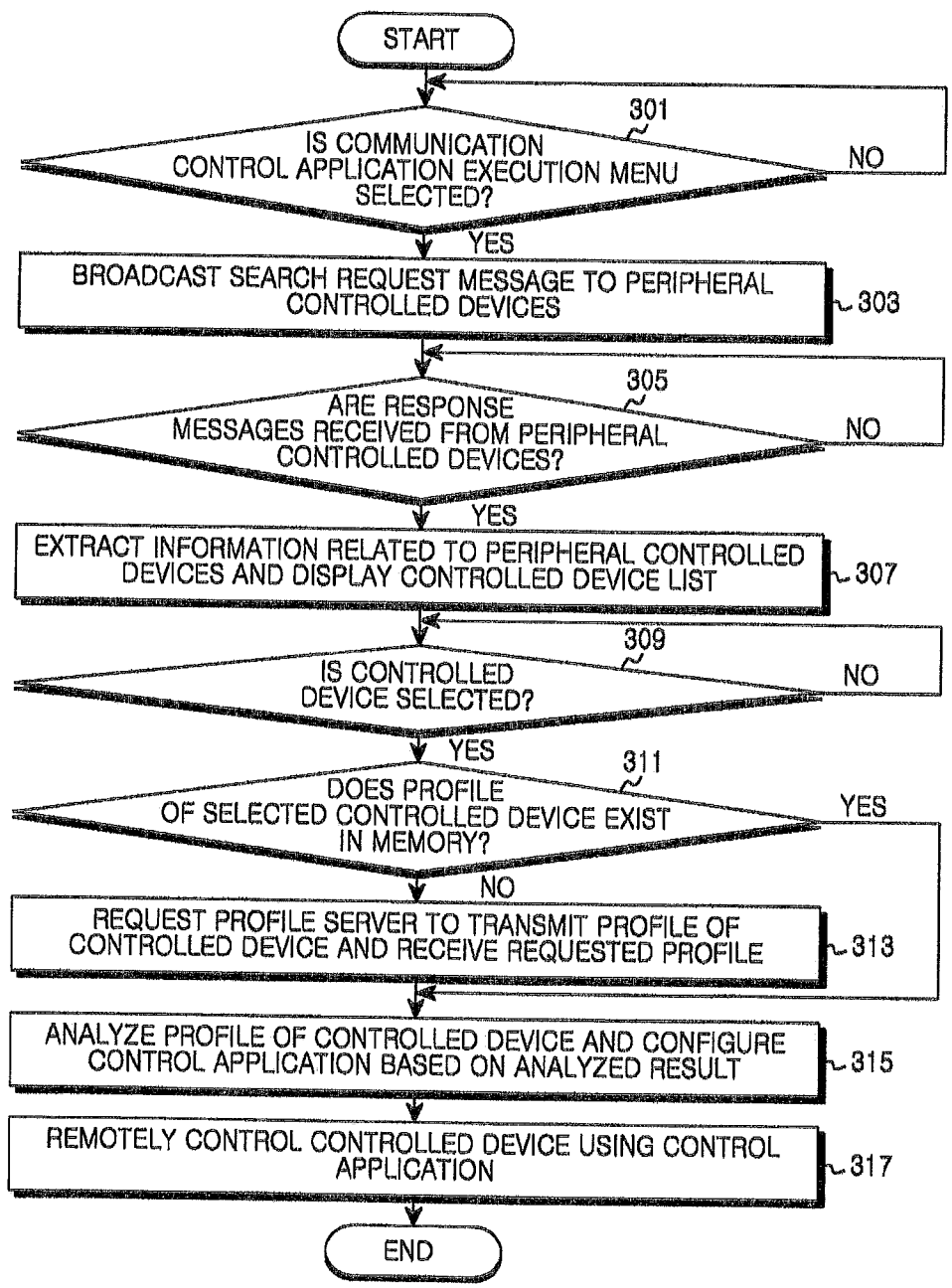
FIG. 3 illustrates an example process of remotely controlling peripheral devices in a mobile communication terminal according to one embodiment of the present disclosure.

FIG. 3 illustrates an example process of remotely controlling peripheral devices in a mobile communication terminal according to one embodiment of the present disclosure. In step 301, a terminal determines whether a communication control application execution menu is selected according to a key selected by a user.

If the communication control application execution menu is selected in step 301, the terminal broadcasts a search request message to controlled peripheral devices to ascertain whether the controlled peripheral devices exist within a controllable range in step 303. In one embodiment, the terminal broadcasts the search request message to the controlled peripheral devices, using one or more physical communication interfaces (e.g., Bluetooth, Zigbee, etc.) and various communication protocols (e.g., a UPnP, a DLNA, a TCP, a UDP, an SNMP, an RF4CE, etc.) for each device. In this particular embodiment, the controlled peripheral devices include all of a device in which a control function for the corresponding device are configured in the terminal and a device in which a control function for the corresponding device does not initially exist in the terminal.

The terminal determines whether response messages for the search request message are received from the controlled peripheral devices in step 305. In one embodiment, each of the response messages includes information related to a corresponding controlled peripheral device. For example, the information related to the controlled peripheral device may include a variety of information such as a device name, a model name, a device type (for indicating whether to control a device), a network address, a service name, a service kind, an application name, and an application kind.

When the response messages for the search request message are received from the controlled peripheral devices in step 305, the terminal verifies that the controlled peripheral devices exist within their controllable range. In step 307, the terminal extracts information related to the controlled peripheral device from each of the response messages received according to the controlled peripheral devices and displays a controlled peripheral device list on a picture based on the extracted information related to each controlled peripheral device.

In step 309, the terminal determines whether one controlled peripheral device is selected on the controlled peripheral device list displayed on the picture according to a key selected by the user.

When the one controlled peripheral device is selected on the controlled peripheral device list displayed on the picture in step 309, the terminal determines whether a profile of the selected controlled peripheral device exists in a memory using information related to the selected controlled peripheral device in step 311.

When the profile of the selected controlled peripheral device exists in the memory in step 311, the terminal proceeds to step 315. Although FIG. 3 does not illustrate that the profile of the selected controlled peripheral device exist in the memory, if the profile of the selected controlled peripheral device exists in the memory, the terminal transmits version information of the profile that exists in the memory to the profile server. If a newly updated profile exists in the profile server, the terminal receives the newly updated profile from the profile server and may updates the profile that exists in the memory.

Meanwhile, when the profile of the selected controlled peripheral device does not exist in the memory in step 311, the terminal requests the profile server to transmit the profile of the selected controlled peripheral device using the information related to the selected controlled peripheral device, for example, using a device name and receives the profile of the selected controlled peripheral device from the profile server. At this time, the profile server may search the profile of the selected controlled peripheral device using the information received from the terminal and may transmit the searched profile to the terminal.

In step 315, the terminal analyzes the profile of the controlled peripheral device, which exists in the memory or is received from the profile server, configures a control application for the selected controlled peripheral device in real time based on the analyzed result, and displays the configured control application as a picture on the UI of the terminal. In one embodiment, the profile includes UI information for configuring the picture and control command information to be registered in objects. Also, the profile may include a communication protocol in addition to them. The UI information includes image information and layout information of objects for configuring the picture. For example, as shown in FIG. 4, the objects may include objects of diverse types, which may be provided to the user through the terminal, such as a button, a touch input, a gesture input, a sensor input, a file list, a moving picture, and music. That is, the terminal may extract the UI information for configuring the picture and the control command information to be registered in the objects from the profile of the controlled peripheral device, arrange images of the respective objects on the picture using the extracted UI information, and connect the extracted control command information to the respective objects. The terminal may also map the images of the respective objects arranged on the picture to the control command information for the respective objects and registers the mapped information.

In step 317, the terminal may remotely control the selected controlled peripheral device according to a selected operation of the user using the configured control application. That is, if the user selects the image of the object arranged on the picture, the terminal may then verify control command information mapped to the image of the object, process the verified control command information according to a communication protocol (e.g., standards of a TCP, a UDP, a UPnP, etc.) defined in a corresponding profile, and transmit the processed control command information to a corresponding controlled peripheral device. Also, if information is received from the corresponding controlled peripheral device, the terminal analyzes the received information, compares the analyzed information with registered control command information, and performs a suitable operation.

Thereafter, the terminal ends the process of FIG. 3.

Although FIG. 3 does not illustrate that a controlled peripheral device executes any application (or service) while the terminal remotely controls the controlled peripheral device; however, if the controlled peripheral device executes any application (or service) while the terminal remotely controls the controlled peripheral device, the terminal may automatically configure the optimum control application capable of interacting with a corresponding application. The terminal may acquire a profile or profile identifier of a service or application which is currently performed or changed from a corresponding controlled peripheral device (e.g. search for it from the memory or request the profile server to receive it) and configure a control application capable of providing the optimum control function to the user in real time. For example, if a personal computer (PC) functioning as a controlled peripheral device is searched and selected, the terminal may configure a control application related to a mouse and keyboard function of the PC based on a profile of the PC and may remotely control the PC using the configured control application. If the PC executes an application such as Media Player or Power Point, it may transmit a profile or profile identifier of the corresponding application to the terminal to allow the terminal to acquire the corresponding profile (e.g. search for it from the memory or request the profile server to receive it) and configure the control application capable of providing the optimum control function to the user based on the acquired profile. That is, when the Media Player is executed in the PC, the terminal provides a control function for the Media Player to the user based on a profile in which information such as reproduction information, pause information, and volume adjustment information is loaded. When the Power Point is executed in the PC, the terminal may provide control functions such as a mode change function, a previous page change function, and a next page change function.

The present disclosure may reduce the burden connecting to an external server, download a control application for controlling different controlled peripheral device, and install the control application in the terminal by configuring one integrated control application based on a profile with respect to a variety of peripheral controllable devices. Also, because a variety of controllable devices and applications (or services) may be managed on one picture, the present disclosure may have an advantage in that the variety of devices and applications (or services) may be controlled with a single integrated control application without selecting and executing a control application suitable for a controlled peripheral device among multiple control applications.

Also, because a control application for a new device (service or application) may be simply provided through profile acquisition and update without additional development of a device using search, control protocol, and control functions, the present disclosure may provide an advantage in that development resources may be reduced. Also, because there is no need to separately develop a control application according to each model, and provide the developed control application to the user with respect to a product which provides a variety of functions specialized according to each model even if the product is one product group, the present disclosure may have an advantage in that management and distribution of the control application may be quickly and conveniently performed.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An electronic device, comprising:
one or more memories configured to store instructions;
a communication interface; and
one or more processors, operably coupled to the one or more memories and the communication interface, configured to:
  display one or more objects indicating one or more external electronic devices respectively, on a user interface (UI) of an application for controlling the one or more external electronic devices;
  in response to detecting an input on an object among the one or more objects that selects the object, determine whether a profile associated with the selected object is included in the memory, the profile includes control information;
  when the profile is not included in the memory, transmit to a server, a request for the control information for controlling an external electronic device, of the one or more external electronic devices, indicated by the selected object;
  receive, from the server, the control information including data regarding at least one function of the external electronic device; and
  display another UI of the application that provides at least one executable object thereon for performing the at least one function of the external electronic device indicated by the selected object.

2. The electronic device of claim 1, wherein the one or more processors are further configured to:

broadcast a message to search another electronic device located around the electronic device;

receive, from the one or more external electronic devices, one or more messages including information regarding the one or more external electronic devices; and display, in response to receiving the one or more messages, the one or more objects on the UI for the application.

3. The electronic device of claim 2, wherein the information regarding the one or more external electronic devices includes at least one of:

data regarding a device name of the one or more external electronic devices, data regarding a model name of the one or more external electronic devices, data regarding a network address of the one or more external electronic devices, data regarding a service name of the one or more external electronic devices, data regarding a service type of the one or more external electronic devices, data regarding an application installed in the one or more external electronic devices, or data regarding a type of the application.

4. The electronic device of claim 1, wherein the one or more processors are further configured to:

identify that the control information is not stored in the electronic device; and request the control information to the server, in response to identifying that the control information is not stored in the electronic device.

5. The electronic device of claim 4, wherein the one or more processors are further configured to:

identify that the control information is stored in the electronic device; and display the at least one executable object on the other UI, based on the control information that is stored in the electronic device.

6. The electronic device of claim 1, wherein:

the control information includes UI data for configuring the other UI, and the UI data includes at least one of image information regarding the at least one executable object or layout information regarding an arrangement of the at least one executable object.

7. The electronic device of claim 6, wherein the one or more processors are further configured to:

display the at least one executable object arranged based on the control information on the other UI for the application.

8. A method of an electronic device, the method comprising:

displaying one or more objects indicating one or more external electronic devices respectively, on a user interface (UI) of an application for controlling the one or more external electronic devices;

in response to detecting an input on an object among the one or more objects that selects the object, determining whether a profile associated with the selected object is included in a memory of the electronic device, the profile includes control information;

when the profile is not included in the memory, transmitting, to a server, a request for the control information for controlling an external electronic device, of the one or more external electronic devices, indicated by the selected object;

receiving, from the server, the control information including data regarding at least one function of the external electronic device; and displaying another UI of the application that provides at least one executable object thereon for performing the at least one function of the external electronic device indicated by the selected object.

9. The method of claim 8, wherein the displaying the one or more objects comprises:

broadcasting a message to search another electronic device located around the electronic device;

receiving, from the one or more external electronic devices, one or more messages including information regarding the one or more external electronic devices; and displaying, in response to receiving the one or more messages, the one or more objects on the UI for the application.

10. The method of claim 9, wherein the information regarding the one or more external electronic devices includes at least one of:

data regarding a device name of the one or more external electronic devices, data regarding a model name of the one or more external electronic devices, data regarding a network address of the one or more external electronic devices, data regarding a service name of the one or more external electronic devices, data regarding a service type of the one or more external electronic devices, data regarding an application installed in the one or more external electronic devices, or data regarding a type of the application.

11. The method of claim 8, wherein the request for the control information comprises:

identifying that the control information is not stored in the electronic device; and requesting the control information to the server, in response to identifying that the control information is not stored in the electronic device.

12. The method of claim 11, further comprising:

identifying that the control information is stored in the electronic device; and displaying the at least one executable object on the other UI, based on the control information that is stored in the electronic device.

13. The method of claim 8, wherein:

the control information includes UI data for configuring the other UI, and the UI data includes at least one of image information regarding the at least one executable object or layout information regarding an arrangement of the at least one executable object.

14. The method of claim 13, wherein the displaying the at least one executable object comprises displaying the at least one executable object arranged based on the control information on the other UI for the application.

15. A computer program product comprising a non-transitory computer readable storage medium containing a computer readable program stored therein that when executed causes at least one processor of an electronic device to:

display one or more objects indicating one or more external electronic devices respectively, on a user interface (UI) of an application for controlling the one or more external electronic devices;

in response to detecting an input on an object among the one or more objects that selects the object, determine whether a profile associated with the selected object is included in a memory of the electronic device, the profile includes control information;

when the profile is not included in the memory, transmit to a sever, a request for the control information for controlling the external electronic device, of the one or more external electronic devices, indicated by the selected object;

receive, from a server, the control information including data regarding at least one function of the external electronic device; and display another UI of the application that provides at least one executable object for performing the at least one function of the external electronic device indicated by the selected object.

16. The computer program product of claim 15, wherein to display the one or more objects the computer readable program when executed further cause the at least one processor to:

broadcast a message to search another electronic device located around the electronic device;

receive, from the one or more external electronic devices, one or more messages including information regarding the one or more external electronic devices; and display, in response to receiving the one or more messages, the one or more objects on the UI for the application.

17. The computer program product of claim 16, wherein the information regarding the one or more external electronic devices includes at least one of:

data regarding a device name of the one or more external electronic devices, data regarding a model name of the one or more external electronic devices, data regarding a network address of the one or more external electronic devices, data regarding a service name of the one or more external electronic devices, data regarding a service type of the one or more external electronic devices, data regarding an application installed in the one or more external electronic devices, or data regarding a type of the application.

18. The computer program product of claim 15, wherein to request the control information, the computer readable program when executed further cause the at least one processor to:

identify that the control information is not stored in the electronic device; and request the control information to the server, in response to identifying that the control information is not stored in the electronic device.

19. The computer program product of claim 15, wherein:

the control information includes UI data for configuring the other UI, and the UI data includes at least one of image information regarding the at least one executable object or layout information regarding an arrangement of the at least one executable object.

20. The computer program product of claim 19, wherein to display the at least one executable object, the computer readable program when executed further cause the at least one processor to:

display the at least one executable object arranged based on the control information on the other UI for the application.

* * * * *